US007942662B2

(12) United States Patent
Roemer et al.

(10) Patent No.: US 7,942,662 B2
(45) Date of Patent: May 17, 2011

(54) ROTARY PRESS

(75) Inventors: Harald Roemer, Reinbek (DE); Frank Schade, Tramm (DE); Peter Lueneburg, Berkenthin (DE)

(73) Assignee: Fette GmbH, Schwarzenbek (DE)

( * ) Notice: Subject to any disclaimer, the term of this patent is extended or adjusted under 35 U.S.C. 154(b) by 180 days.

(21) Appl. No.: 12/324,408

(22) Filed: Nov. 26, 2008

(65) Prior Publication Data

US 2009/0142438 A1 Jun. 4, 2009

(30) Foreign Application Priority Data

Nov. 30, 2007 (DE) ........................ 10 2007 057 791

(51) Int. Cl.
*B29C 43/08* (2006.01)

(52) U.S. Cl. ....................................... 425/345; 425/451

(58) Field of Classification Search .................. 425/145, 425/344–345, 451
See application file for complete search history.

(56) References Cited

U.S. PATENT DOCUMENTS

| | | | | |
|---|---|---|---|---|
| 6,761,554 B2 * | 7/2004 | Patel | ............................ | 425/345 |
| 7,364,420 B2 * | 4/2008 | Luneburg et al. | ............. | 425/345 |
| 7,553,436 B2 * | 6/2009 | Dukler et al. | ................. | 425/345 |
| 2009/0035413 A1 * | 2/2009 | Schade et al. | ................ | 425/453 |

FOREIGN PATENT DOCUMENTS

DE 10 2004 040 163 B3 5/2006

* cited by examiner

*Primary Examiner* — Richard Crispino
*Assistant Examiner* — Thu Khanh T Nguyen
(74) *Attorney, Agent, or Firm* — Vidas, Arrett & Steinkraus

(57) ABSTRACT

A rotary press wherein the dosage drive and the compression roller drive have identical installation means, the stand has an upper and a lower accommodation platform and the accommodation platforms have identical accommodation means for the installation means on the sides facing each other, which are in a coincident arrangement with respect to each other.

8 Claims, 3 Drawing Sheets

ROTARY PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Rotary presses serve for the manufacture of tablets above all, in the pharmaceutical field for instance. However, they can be used everywhere where articles pressed from powder material are desired, for instance in the field of candies and foodstuffs, for washing agents and so on.

The basic construction of a rotary press is always the same. It has a rotor, which is driven around a vertical axis by a suitable drive motor. The rotor contains an upper and a lower punch guide, which receive upper and lower punches, respectively. The punches co-operate with bores of a die plate, which is arranged between the punch guides. Material which is to be compressed is supplied to the die bores, and heads of the upper and lower punches, respectively, co-operate with compression rollers in compression stations in order to press the compression material in the die bores together. The compression material is fed into the die bores via a suitable filling station. Outside of the compression stations, the punch heads are guided by suitable radial cam sections. For instance, a radial filling cam section is associated to the filling station, which provides that the lower punches project into the die bores for a preset extent in the region of the filling station. This extent determines the filling volume, and with this also the weight of the pressed tablet. In the strip-off region, in which the compressed tablets are stripped off from the upper side of the die plate, a radial cam provides that the lower punches are lifted so far that the pressed articles can be captured and shoved off by the stripping device. Furthermore, a corresponding radial cam section provides for the upper punches that sufficient space remains for the filling station for filling in compression material again.

Such a rotary press is commonly known. For instance, it is made reference to DE 10 2004 040 163 A1, the entire contents of which is incorporated herein by reference.

It is further known to form single layer or multilayer compressed articles with the described rotary press. For the single layer compressed article, one filling- and dosage station and one pre-compression and one main compression station are usually provided, each at a time with an upper and a lower compression roller. In a rotary press for producing two-layer tablets, only one compression station is usually used for the compression of the first layer. Subsequently, the material for the second layer is filled in with the aid of a second filling- and dosage station. The definite pressing together of the two layers takes then place by a pre-compression station and a main compression station. When three or more layers are formed into a tablet, the sequential arrangement of filling- and dosage stations and compression stations is correspondingly continued.

However, it is also known to increase the production capacity with single layer pressed articles in that two or more filling- and dosage stations are provided, to each one of which at least one compression station is arranged downstream. In this way, the production capacity can be doubled or multiplied at equal rotational speed of the rotary press.

The user of a rotary press decides which kind of rotary press is necessary or optimum for his/her production. When he/she produces single layer tablets in small batches, he/she will chose a relatively small rotary press, which has only one filling- and dosage station and two compression stations. When he/she desires to produce greater batches, according to the conditions he/she will prefer a rotary press which has two filling- and dosage stations, each one with two compression stations at a time. With such a rotary press, even a double layer tablet can be produced, when it is suitably remodelled. When the user desires to produce very large batches or three-layer tablets, he/she will provide three filling- and dosage stations, each one with two compression stations at a time. For each one of the described kinds of rotary presses, the stand has to be dimensioned correspondingly, and the press manufacturer has to provide different construction series for the rotary presses in order to fulfil the different user requirements.

The present invention is based on the objective to provide a rotary press which fulfils the different user requirements with a minimal expenditure of production and which can be remodelled to another usage form with little expense, even retroactively.

BRIEF SUMMARY OF THE INVENTION

In the rotary press according to the invention, the stand has an upper and a lower accommodation platform. The at least one dosage drive and the at least one compression roller drive have identical installation means. The accommodation platforms have identical accommodation means for the installation means on the sides facing each other. Thus, it is irrelevant whether a dosage drive or a compression roller drive is fixed on an accommodation means of a platform. With two or more compression stations and filling- and dosage stations, either a single layer tablet or a two layer or a multilayer tablet can be produced with an identically formed platform, for instance.

Preferably, the pitch circles of the lower and the upper accommodation platform on which the filling- and dosage stations and the compression stations are arranged have the same diameter.

The rotary press according to the present invention can be used for small batches, but however, by building in further filling- and dosage and compression stations, it can also be used for the production of single layer tablets in big batches. In addition, it may be remodelled for two layer tablets or for three layer tablets, when accommodation means for three dosage stations and four compression stations are provided on the platform.

With the aid of the present invention, compression stations and filling- and dosage stations can be installed in the rotary press even in an exchangeable manner. Setting up for single layer, two layer and multilayer operation is possible in a simple way with the same machine stand; also remodelling at the user. Through this, the usage flexibility of a rotary press concept is significantly increased. The production expenditure for such a flexible rotary press is relatively small, in particular in the light of the manifold usage possibilities, which are required for one rotary press at a time. For the different kinds of usage described above, the number of press constructions is minimised. For instance, a single layer as well as a multilayer tablet can be formed with one construction, provided the corresponding stations are at hand.

According to one embodiment of the present invention, the lower accommodation platform has seven accommodation means. The accommodation means can be formed by identical receptacle openings in the lower and the upper accommodation platform, respectively.

The radial dosage- and fillings cams, respectively, for the filling- and dosage station, as well as the compression rollers, are adjustable in the height by means of a suitable dosage- or compression roller drive, respectively. According to one embodiment of the present invention, the upper and the lower accommodation platform have cavities, in which are arranged at least one dosage- and at least one compression roller drive, respectively. According to a further embodiment of the present invention, compression roller drive and dosage drive are identical and form a unit with a compression roller and a filling- and dosage station, respectively. Therefore, it is irrelevant in the installation whether a compression station or a filling- and dosage station is installed on an accommodation means of the accommodation platform. No special construction or reassembly of the rotary press is therefore necessary for this purpose in order to design the rotary press in the desired fashion. It is to be understood that the cavities in the accommodation platforms are easily accessible for installation procedures.

As already mentioned, upper and lower punches co-operate with corresponding different radial cam sections outside of the compression stations. The radial cam sections can be installable on the upper and the lower accommodation platform. The assigned radial cam sections can be fixed on sites of the platform which were envisioned previously. In a replacement of a filling- and dosage station by a compression station, the associated radial cam sections may be replaced also, without that an installation possibility on the radial cam carriers has to be provided in advance. The installation possibilities for the changeover of the different radial cam sections are already existing.

DETAILED DESCRIPTION OF THE INVENTION

Figure 1:
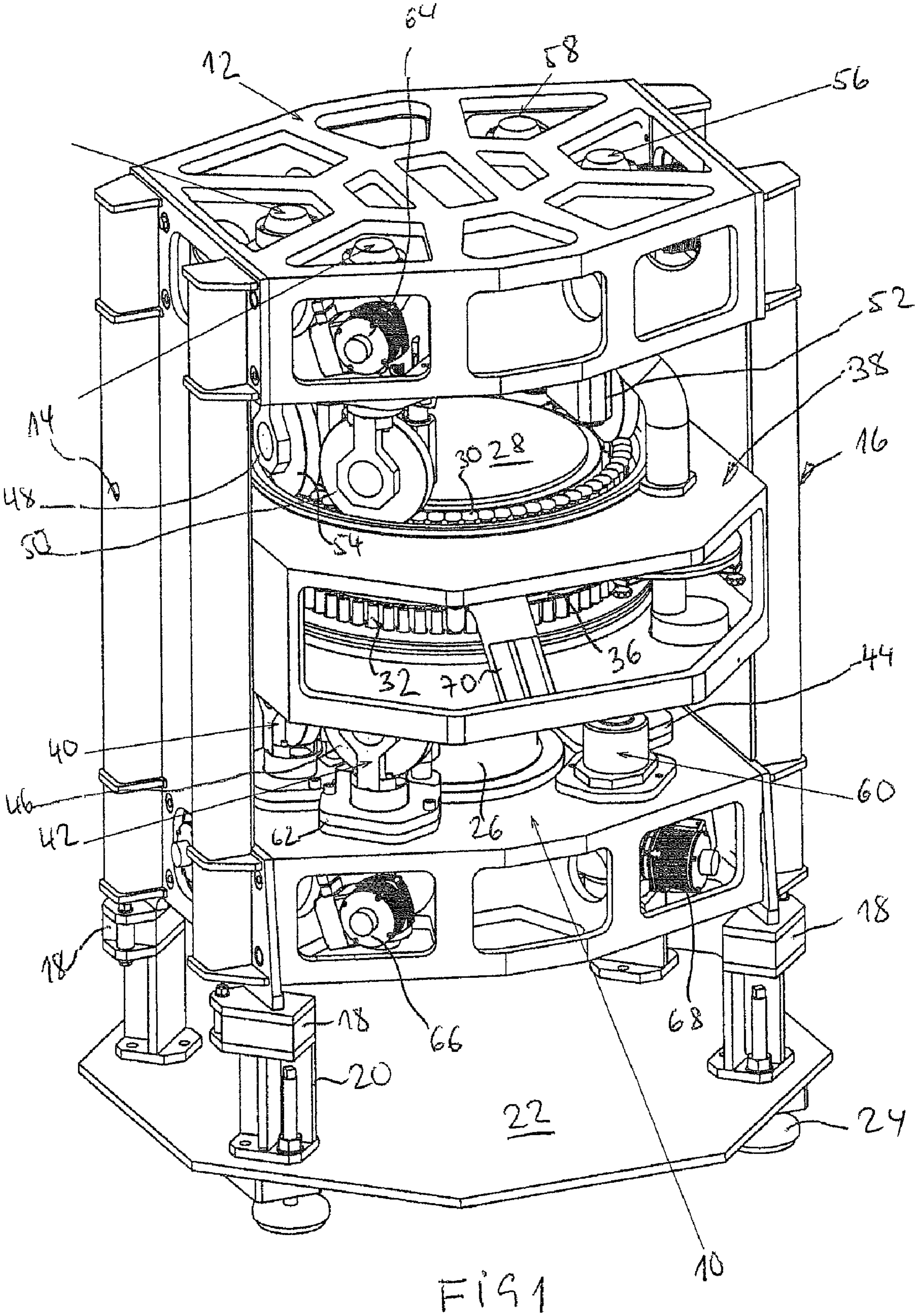
FIG. 1 shows a rotary press according to the present invention in a perspective view.

While this invention may be embodied in many different forms, there are described in detail herein a specific preferred embodiment of the invention. This description is an exemplification of the principles of the invention and is not intended to limit the invention to the particular embodiment illustrated A rotary press after FIG. 1 has a stand, which has a lower accommodation platform 10 and an upper accommodation platform 12. The platforms 10, 12 are frame-like and contain plural cavities. The accommodation platforms 10, 12 are polygonal in their outline, octagonal in the present case, wherein supports 14, 16 attached on opposing sides at the outside keep the accommodation platforms 10, 12 in the predetermined distance from each other. The supports 14, 16 are supported on lower supports 20 via damping elements 18, which on their part stand on a base platform 22. The base platform 22 stands on the ground via feet 24.

The lower accommodation platform 10 has a central pillar 26, on which a rotor 28 is mounted rotatably around a vertical axis. The rotor 28 contains an integrated electric drive motor (not shown). The kind of the motor which is built in is disclosed in DE 10 2004 040 163 A1, for instance, the entire contents of which is incorporated herein by reference. The rotor 28 is composed of an upper and a lower punch guide, which are not separately featured here. The punch guides guide upper punches 30 and lower punches 32 in suitable guide bores. The compression punches 30, 32 co-operate with die bores of a die plate 36 (shown only in an adumbrated manner).

Radial cams are also assigned to the compression punches 30, 32, which are incorporated in the upper and lower radial cam carriers, respectively, on the accommodation platforms 10, 12. They are omitted for reasons of better depiction. As can be recognised further, the proper processing region, i.e. the die plate and the greatest part of the punch guides, is sealingly surrounded by a casing 38, so that dusty compression material does not arrive in the exterior.

In FIG. 1 one recognises that lower compression roller arrangements are installed on the lower accommodation platform 10 at 40 or 42 and 44, respectively. The compression rollers 46 of this compression roller arrangement co-operate with the heads of the lower punches 32. Correspondingly, upper compression roller arrangements with a compression roller 54 are installed on the lower side of the upper accommodation platform 12 at 48, 50 and 52. The compression rollers 54 co-operate with the heads of the upper punches 30 which face them. Each compression station is made up of a roller arrangement, for example 40 and roller 46, 42 and roller 46 and 44 and roller 46, making up three lower compression stations. The upper compression stations are formed of 48, 50 and 52, each combined with a roller 54. The coincident pairs of upper and lower compression stations 40 and 48, 42 and 50, and 44 and 54, form three pairs of compression stations. However, even further compression stations may be provided, which are not shown in the present case. Yet, they are indicated with respect to the upper compression rollers at 56, 58.

In FIG. 1, a dosage- or filling station 60 is also provided, which is arranged on the lower accommodation platform 10. Details of the filling station are not shown.

As can be further seen from FIG. 1, the lower compression roller arrangements 40, 42 and 44 as well as the dosage station 60 are fixed on the accommodation platform 10 with the aid of suitable plates 62. The attachment takes place by screwing for instance.

Compression roller drives for adjusting the compression rollers 46, 54 in the height belong to the compression roller arrangements. For instance, the same are depicted at 64 for the upper accommodation platform 12, and at 66 and 68 for the lower accommodation platform 10. The installation of these drives takes place in cavities of the accommodation platforms 10, 12. Even the dosage station 60 has a drive for the radial dosage cam, which is also housed in a cavity of the accommodation platform 10 and can be recognised at 68.

The attachment of the compression roller arrangements on the accommodation platforms 10, 12 takes place on a pitch circle, wherein both pitch circles can have the same diameter. In addition, the accommodation means on the platforms 10 and 12, respectively, are identical, so that for instance the dosage station 60 can be set on the position of the compression roller arrangement 42, 40 or 44. Vice versa, the compression roller arrangement 42 can be set on the position of the dosage station 60, for instance. In an arrangement or an exchange of the described kind, the associated drives have to be added also, of course. For this reason, the cavities in which the drives 64 or 66 or the dosage drive 68 are accommodated have identical accommodation means, so that only a minimum expenditure for the production, the installation or the replacement is necessary. No particular measures for the respective kind of use have to be taken on the stand. With a predetermined number of accommodation means in the platforms 10, 12, a number of different applications of the rotary press can be realized.

Figure 2:
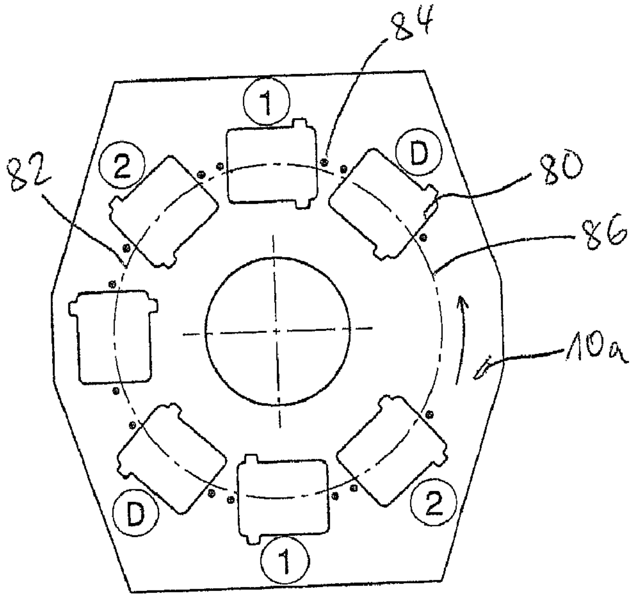
FIG. 2 shows schematically a top view on a lower accommodation platform for a rotary press after FIG. 1, with accommodation means.

By means of the FIGS. 2 and 3, the multifunctional usability of the rotary press after FIG. 1 will be explained. In FIG. 2, an accommodation platform 10*a* is shown, which corresponds to the lower accommodation platform 10 according to FIG. 1, for instance. It is provided with seven identical receptacle openings 80, which are situated on a pitch circle 82 which is concentric to the pitch circle of the die bores, as the same are indicated at 84. The receiving bores have an approximately equal distance from each other, and only in the region 86 they have a greater distance. This region is the stripping region for the compressed articles which are pushed out. It is indicated at 70 in FIG. 1 by a chute.

Each one of the receptacle openings 80 is suited to accommodate either a lower compression roller drive or a dosage drive. In FIG. 2, the accommodation of dosage drives is indicated with D, and the accommodation of a pre-compression roller drive with 1 and that of a main compression roller drive with 2. One recognises that single layer pressed articles can be produced with the aid of such an arrangement, wherein the production capacity at equal rotational speed of the rotor is twice that of a rotary press which has only one dosage station and two compression stations.

When a double layer tablet is to be produced in FIG. 2, the compression roller 2 according to FIG. 2 is replaced by a dosage station D after the first dosage station D, for instance. Alternatively, the corresponding pre-compression station is omitted. It is to be understood that a three layer tablet can be produced with the arrangement of FIG. 2 also, namely by providing three filling- and dosage stations and four compression stations. It is to be understood that a filling device belongs to a dosage drive too, which must be installed in addition, so that filling- and dosage station are composed of the dosage drive and the filling device.

It is further to be understood that the upper accommodation platform, as indicated in FIG. 1, can also have receptacle openings 80, and that in another arrangement of filling- and dosage stations and compression roller arrangements in the lower accommodation platform 10*a*, this leads to a corresponding change of the position of the compression roller arrangements in the upper accommodation platform.

Figure 3:
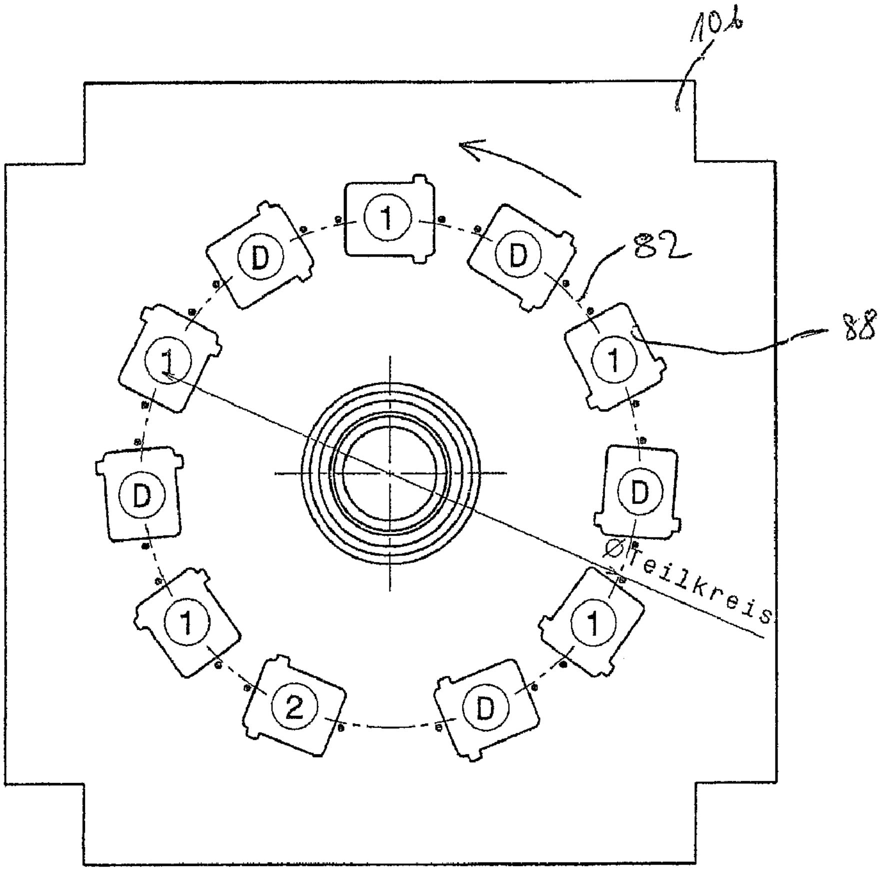
FIG. 3 shows schematically a top view on another accommodation platform with accommodation means according to the present invention.

In FIG. 3 is indicated a lower accommodation platform 10*b*, which has eleven identical receptacle openings 88. Again, they are arranged on a pitch circle 82. In the shown case, a five layer tablet is produced. A compression station D is followed by a precompression- and a compression station 1 and 2, respectively. If only a single layer or a two layer tablet is to be produced instead, dosage station and compression roller arrangement have to be arranged correspondingly in order to obtain the desired result.

Figure 4:
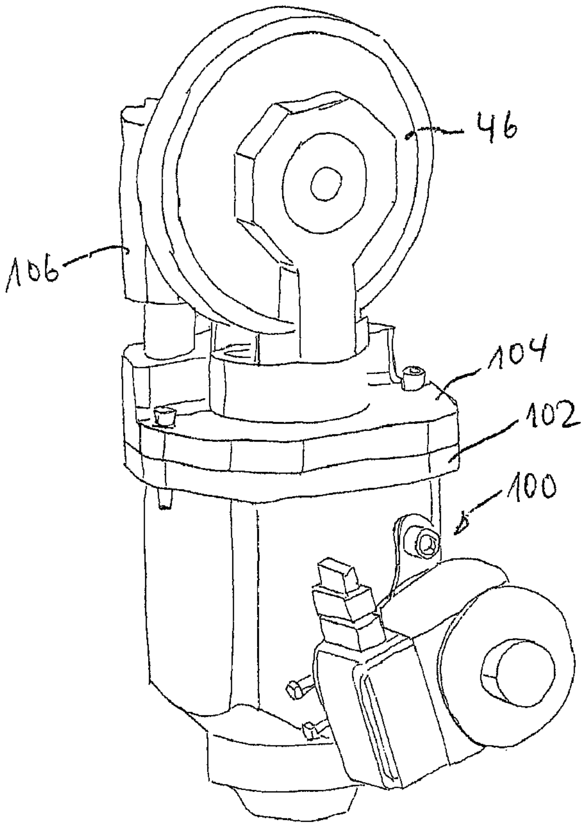
FIG. 4 shows a unit of a compression roller and a compression roller drive in a perspective view.

In FIG. 4, the compression roller 46 after FIG. 1 is exemplified in a perspective view. It is adjusted in the height by a suitable drive- and gearbox unit 100. The unit 100 has a flange 102, which is screwed together with a flange 104, a guide 106 for the compression roller 46 is attached on the flange 104. The flanges 102, 104 are attached to the associated accommodation platform, here the accommodation platform 10, in a receptacle opening as shown in FIG. 1, 2 or 3. All the compression rollers as depicted in FIG. 1 can be provided with an identical drive- and gearbox unit 100 and they can form a unit in order to install them in a suitable receptacle opening of the accommodation platform.

Figure 5:
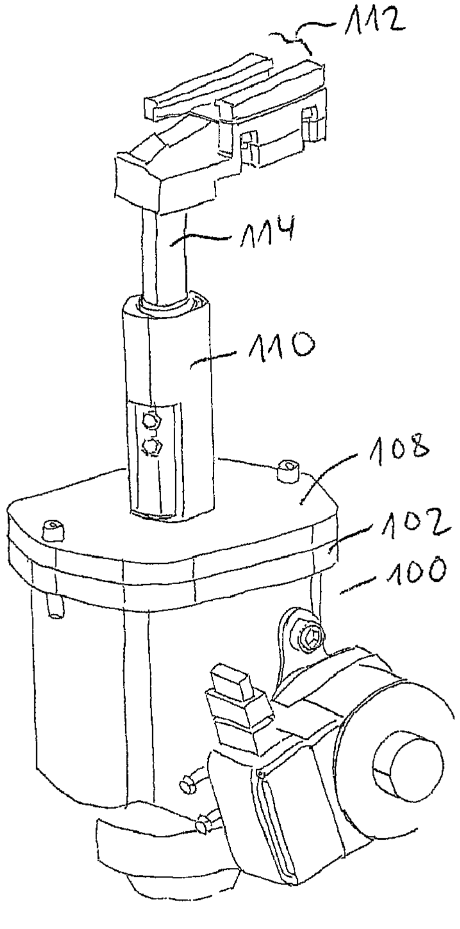
FIG. 5 shows a radial dosage cam and the dosage drive as a unit, in a perspective view.

Even in FIG. 5, the drive- and gearbox unit 100 after FIG. 4 is depicted in a perspective view. Its flange 102 is screwed together with a flange 108, which has the same dimensions as the flange 104 after FIG. 4. The flange 108 has a guide 110 for a radial dosage cam element 112, which is attached to a rod 114, which is in turn guided in the guide 110. The drive- and gearbox unit 100 can effect a height adjustment of the rod 114, and with it of the radial dosage cam element 112, in order to adjust the dosage in a not shown filling- and dosage station.

One recognises by means of the FIGS. 4 and 5 that the compression rollers and the radial dosage cam elements have identical drive- and gearbox units and that they form a unit with the same, in order to attach them after FIG. 1 in a desired receptacle opening in the platform 10 or 12, respectively.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A rotary press with a stand, in which a rotor driven by a drive motor is rotatably mounted around a vertical axis, wherein the rotor has an upper and a lower punch guide for a plurality of upper and lower punches and a die plate between the punch guides, wherein further the upper and lower punches co-operate with die bores of the die plate, and further including at least one filling- and dosage station, the at least one filling- and dosage station has a radial dosage cam element which is adjustable in height by a dosage drive, the dosage drive presets the height of the lower punches in the filling- and dosage station, and further including at least one pair of compression stations, the at least one compression station and the at least one filling- and dosage station being arranged on a circle, each compression station including at least one compression roller, the upper and lower compression rollers co-operate with the upper and lower punches, wherein the compression rollers are adjustable in height by a compression roller drive, wherein the compression roller drive and dosage drive are identical, and therefore either drive can be attached to either the at least one filling- and dosage station or the at least one compression station, the combination of the drive and the at least one filling- and dosage station or the at least one compression station being attached to the stand characterized in that the dosage drive and the compression roller drive are identically attached to the stand, the stand having an upper and a lower accommodation platform and the upper and lower accommodation platforms having identical receptacle openings on the sides facing each other, the receptacle openings in the upper and lower platforms are in a coincident arrangement with respect to each other.

2. The rotary press according to claim 1, characterized in that at least two pair of compression stations and at least two filling- and dosage stations are provided, which are situated on the circle.

3. The rotary press according to claim 2, characterized in that the circles on the upper and the lower accommodation platform have the same diameter.

4. The rotary press according to claim 1, characterized in that upper and/or lower accommodation platform have cavities, in which are arranged the dosage and compression roller drives, respectively.

5. The rotary press according to claim 1, characterized in that the upper and/or the lower accommodation platform is formed by a framework.

6. The rotary press according to claim 1, characterized in that compression roller drive and dosage drive are identical drives and form a unit with the compression rollers and the radial dosage cam element, respectively.

7. The rotary press according to claim 5, characterized in that radial dosage cam elements and compression rollers, respectively, are connected to flanges of the drives.

8. The rotary press according to claim 5, characterized in that the units are connectable with the associated platform by screw joints via the flanges of the drives.

* * * * *